United States Patent
Seth et al.

(10) Patent No.: US 11,449,704 B2
(45) Date of Patent: Sep. 20, 2022

(54) SEARCHING IN MULTILEVEL CLUSTERED VECTOR-BASED DATA

(71) Applicant: International Business Machines Corporation, Armonk, NY (US)

(72) Inventors: Abhishek Seth, Deoband (IN); Devbrat Sharma, Kanpur (IN); Mahendra Singh Kanyal, Kharagpur (IN); Muhammed Abdul Majeed Ameen, Kozhikode (IN); Soma Shekar Naganna, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 16/744,241

(22) Filed: Jan. 16, 2020

(65) Prior Publication Data
US 2021/0224583 A1    Jul. 22, 2021

(51) Int. Cl.
G06K 9/62    (2022.01)
G06V 10/75    (2022.01)
G06V 40/16    (2022.01)

(52) U.S. Cl.
CPC .......... G06K 9/6219 (2013.01); G06K 9/623 (2013.01); G06V 10/757 (2022.01); G06V 40/172 (2022.01)

(58) Field of Classification Search
None
See application file for complete search history.

(56) References Cited

U.S. PATENT DOCUMENTS

| | | | | |
|---|---|---|---|---|
| 8,200,010 B1* | 6/2012 | Jing | ................ | G06K 9/4671 |
| | | | | 382/173 |
| 8,644,562 B2* | 2/2014 | Tosa | ................ | G06T 7/149 |
| | | | | 382/117 |
| 2012/0296891 A1* | 11/2012 | Rangan | ................ | G06F 16/3347 |
| | | | | 707/722 |
| 2014/0241598 A1 | 8/2014 | Fedele et al. | | |
| 2017/0091302 A1 | 3/2017 | Moser et al. | | |

(Continued)

OTHER PUBLICATIONS

Bouhmala et al., "A Multilevel K-Means Algorithm for the Clustering Problem", 2016 IEEE International Conference on Cloud Computing and Big Data Analysis, © 2016 IEEE, 7 pages.

(Continued)

*Primary Examiner* — Tahmina N Ansari
(74) *Attorney, Agent, or Firm* — Michael A. Petrocelli

(57) ABSTRACT

A multilevel clustered data set for multidimensional vectors is created by defining a plurality of clusters based on each of the signed dimensions of the vectors, each dimension functioning as an axis. Vectors are assigned to each cluster by measuring cosine similarity between a vector and each axis. Sub-clusters are defined as ranges of cosine similarity values within a cluster, and each vector is assigned into the appropriate range based on their cosine similarity value with the axis of the cluster. Searching for a matching vector to a new vector is efficiently achieved in near-constant time by measuring cosine similarity for the new vector with each axis to identify the closest cluster, reusing the cosine similarity of the new vector and axis to determine which sub-cluster corresponds to the appropriate range of values, and then comparing each vector within the sub-cluster until a match is found or ruled out.

20 Claims, 5 Drawing Sheets

(56) References Cited

U.S. PATENT DOCUMENTS

2021/0224583 A1\* 7/2021 Seth ................. G06K 9/6211

OTHER PUBLICATIONS

Chaki et al., "Pattern Mining Approaches used in Sensor-Based Biometric Recognition: A Review", IEEE Sensors Journal, vol. 19, No. 10, May 15, 2019, 12 pages.
Goldschmidt et al., "Fast Multilevel Clustering", The Weizmann Institute of Science, 2011, 9 pages, <http://www.wisdom.weizmann.ac.il/~achi/tr05-09.pdf>.
Lechevallier et al., "Multilevel Clustering for large Databases", International Conference on Statistics in Heath Sciences, Nantes, France, ICSHS2004, Jun. 2004, <https://www.rocq.inria.fr/axis/personnel/Yves.Lechevallier/articles/Lechevallier-Ciampi-Nantes-2004.pdf>.
Nguyen et al., "Bayesian Nonparametric Multilevel Clustering with Group-Level Contexts", Proceedings of the 31 st International Conference on Machine Learning, Beijing, China, 2014, JMLR: W&CP vol. 32, 9 pages.

\* cited by examiner

SEARCHING IN MULTILEVEL CLUSTERED VECTOR-BASED DATA

BACKGROUND

The present invention relates generally to the field of multilevel data clustering, and more particularly to multilevel data clustering of vector-based data.

Scale-invariant feature transforms (SIFT) are a feature detection algorithm in the field of computer vision to detect and describe local features in images. SIFT keypoints of objects are initially extracted from a multitude of reference images and stored in a database. An object is recognized in a new input image by comparing each feature from the new image individually to this database and finding candidate matching features based on the Euclidean distance of their feature vectors.

Initially, a set of orientation histograms is created on four by four pixel neighborhoods with eight bins each. These histograms are computed from orientation and magnitude values of samples in a sixteen by sixteen area around the keypoint such that each histogram includes samples from a four by four subregion of the original neighborhood region. The magnitudes are further weighted by a gaussian function, with the gaussian function $\sigma$ equal to one half of the width of the descriptor window. Then, the descriptor becomes a vector of all of the values of these histograms. As there are sixteen histograms (four times four) and each histogram has 8 bins, the vector has 128 elements. Then, this vector is normalized to unit length in order to enhance invariance to affine changes in illumination. In order to reduce the effects of non-linear illumination, a threshold of 0.2 is applied and the vector is again normalized.

Cosine similarity is a measure of similarity between two non-zero vectors of an inner product space which measures the cosine of the angle between them. The cosine of 0° is 1, and it is less than 1 for every angle in the interval $(0,\pi]$ radians. It is therefore a judgment of orientation and not magnitude. Two vectors with the same orientation have a cosine similarity of 1, two vectors oriented at 90° relative to each other possess a similarity of 0, and two vectors diametrically opposed possess a similarity of −1, independent of their magnitudes.

SUMMARY

According to an aspect of the present invention, there is a method, computer program product and/or system that performs the following operations (not necessarily in the following order): (i) receiving a clustered images data set, with the clustered images data set including a plurality of top-level clusters, where a given top-level cluster is determined based on a signed axis and includes a plurality of sub-clusters, where a given sub-cluster is a range of values based, at least in part, on the signed axis of the given top-level cluster and includes one or more multidimensional vectors generated from historical images; (ii) receiving an input image data set; (iii) generating a multidimensional vector based on the input image data set; (iv) determining a top-level cluster closest to the generated multidimensional vector based, at least in part, on the signed axes of the plurality of top-level clusters; (v) determining a sub-cluster of the determined top-level cluster closest to the generated multidimensional vector based, at least in part, on the signed axis of the determined top-level cluster and the generated multidimensional vector; and (vi) determining a subset of one or more vectors of the determined sub-cluster as matches for the input image by comparing the generated multidimensional vector to one or more vectors of the determined sub-cluster.

DETAILED DESCRIPTION

Figure 1:
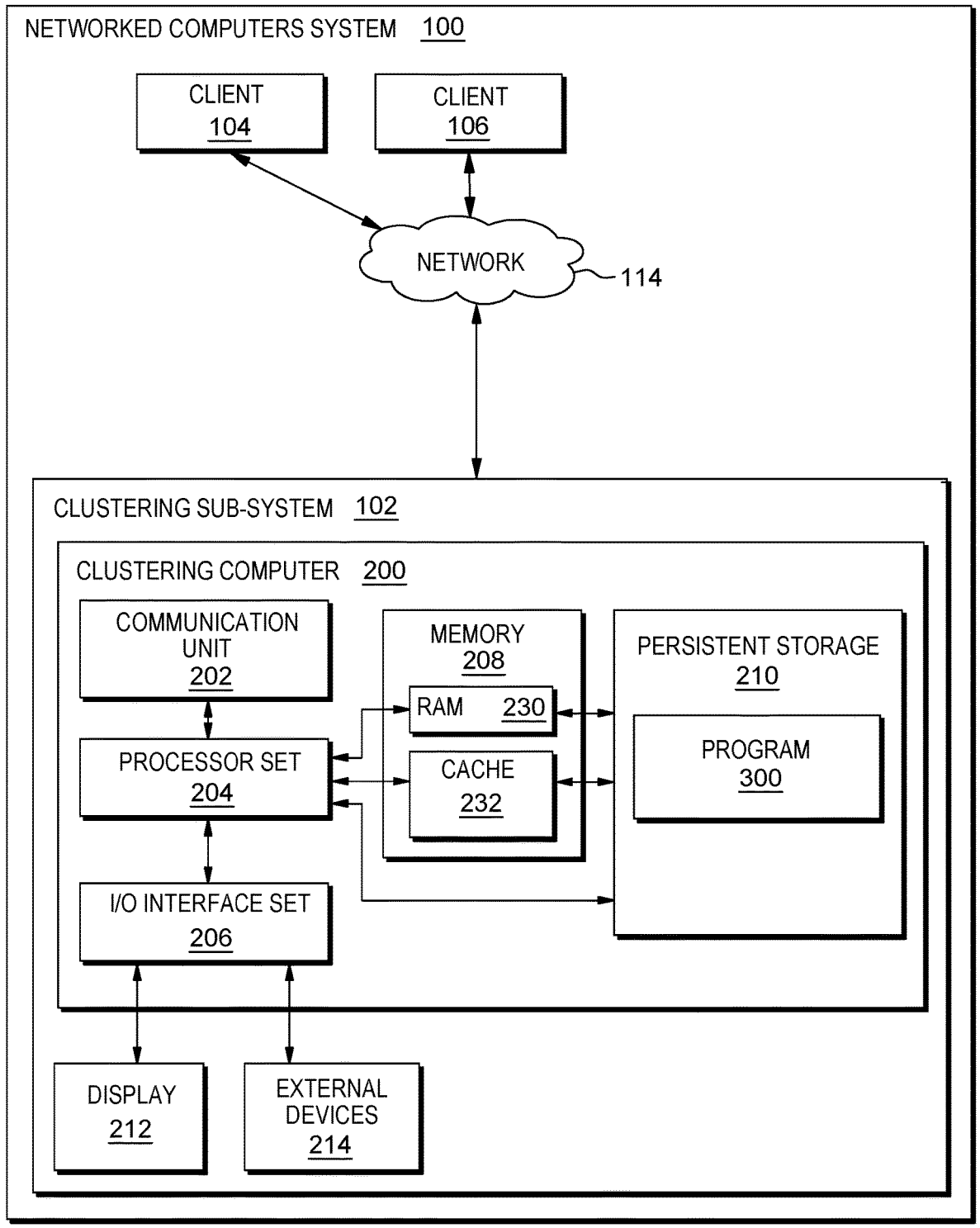
FIG. 1 is a block diagram view of a first embodiment of a system according to the present invention.

Some embodiments of the present invention are directed to creating a multilevel clustered data set for multidimensional vectors by defining a plurality of clusters based on each of the signed dimensions of the vectors, each dimension functioning as an axis. Vectors are assigned to each cluster by measuring cosine similarity between a vector and each axis. Sub-clusters are defined as ranges of cosine similarity values within a cluster, and each vector is assigned into the appropriate range based on their cosine similarity value with the axis of the cluster. Searching for a matching vector to a new vector is efficiently achieved in near-constant time by measuring cosine similarity for the new vector with each axis to identify the closest cluster, reusing the cosine similarity of the new vector and axis to determine which sub-cluster corresponds to the appropriate range of values, and then comparing each vector within the sub-cluster until a match is found or ruled out.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be any thing made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. described in detail with reference to the Figures. Networked computers system 100 includes: clustering subsystem 102 (sometimes herein referred to, more simply, as subsystem 102); client subsystems 104 and 106; and communication network 114. Clustering subsystem 102 includes: clustering computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device(s) 214 (alternatively referred to as external devices set 214). External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
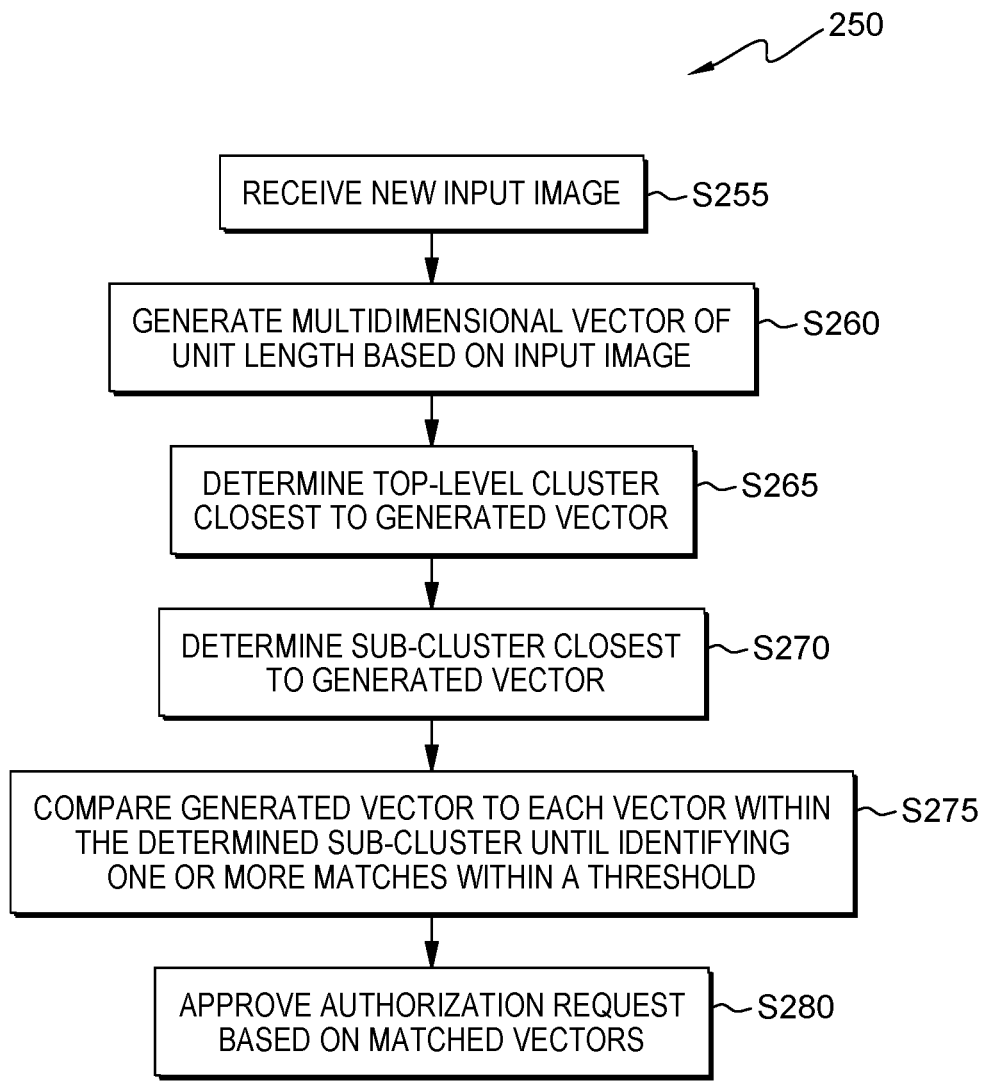
FIG. 2 is a flowchart showing a first embodiment method performed, at least in part, by the first embodiment system.
Figure 3:
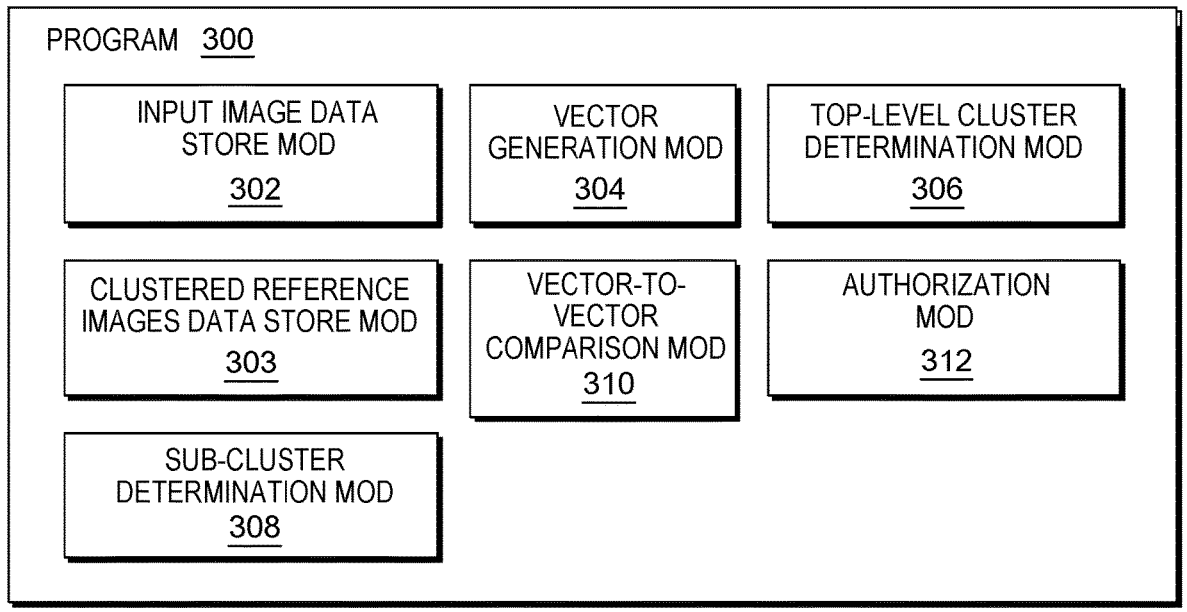
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Processing begins at operation S255, where input image data store module ("mod") 302 receives a new input image. In this simplified embodiment, the input image is a biometric facial image corresponding to an authorization request using a biometric facial image process, with the request directed towards accessing client 104 of FIG. 1, which is a smart-phone device. This image is stored in input image data store mod 302 for subsequent use by modules of program 300. In alternative embodiments, the input image may comprise different types of information, such as fingerprints, retinal scans, or other types of image data.

Processing proceeds to operation S260, where vector generation mod 304 generates a multi-dimensional vector of unit length based on the input image in input image data store mod 302. In this simplified embodiment, mod 304 generates the new multi-dimensional vector through known SIFT techniques. The result of these techniques generates a vector of unit length (1) and 128 dimensions that describes the features of the input image in mod 302, which will be further referred to as "new input vector." Alternatively, entire dimensions of the input vector can be eliminated through comparison of non-distinguishing features against a set of reference vectors. If all vectors possess some dimensions that are identical (and thus, serve no purpose in distinguishing one vector from another), then those non-distinguishing features can be removed to streamline future comparisons and computing efficiency.

Processing proceeds to operation S265, where top-level cluster determination mod 306 determines which top-level cluster is closest to the generated vector. In this simplified embodiment, clustered reference images data store mod 303 includes a clustered images data set, received from client 106, which is structured to include 256 'top-level' bins or clusters with a plurality of vectors within each top-level cluster. These top-level bins are based on the 128 dimensions of vectors generated SIFT techniques applied to historical input images, accounting for positive and negative signs of each dimension, which are henceforth referred to as "signed vectors." These signed vectors function as axes (or signed axes) for cluster definition. Retrieving the cosine similarity measurement between a given input vector and each axis yields a measurement of how closely aligned the given input vector is to each axis, enabling mod 306 to determine which axis is the most closely aligned with a given input vector. In this simplified embodiment, a historical set of biometric facial images have been used to generate a historical set of input vectors which mod 306 has measured cosine similarity for against the 256 axes that define the 256 top-level clusters. Then, using the cosine similarity previously measured, the historical set of input vectors are each assigned to one of the 256 top-level bins. Each bin may feature more than one input vector assigned to it. In this simplified embodiment, each top-level cluster has 100 historical input vectors assigned to it, for a total of 256,000 input vectors in the clustered images data set.

To determine which top-level cluster is closest to the new input vector based on the image stored in mod 302, a cosine similarity measurement is taken against each of the 256 axes of the clustered images data set, where the measurement closest or equal to a value of 1 indicates the closest axis. In this simplified embodiment, a cosine similarity measurement between the new input vector and the first axis, a positive signed axis of the first dimension of a vector of 128 dimensions, results in the closest value out of the remaining 255 axes, with a value of 0.963333. If a cosine similarity measurement for a given vector is identical for two or more bins, then the bin with fewer assigned vectors receives the given vector. If both bins have the same number of vectors, then whichever bin represents the lower numbered dimension, when considering the dimensions of a vector sequentially, receives the given vector. Alternatively, other amounts of clusters may be implemented corresponding to the number of dimensions of corresponding input vectors (for example, 200 bins/clusters for vectors with 100 dimensions).

Processing proceeds to operation S270, where sub-cluster determination mod 308 determines the sub-cluster closest to the generated vector. In this simplified embodiment, the cosine similarity is again used to determine which sub-cluster the new input vector belongs to. First, after the 256 top-level bins are previously created for the clustered images data set, a plurality of sub-clusters are created within each top-level bin, with each sub-cluster including a range of angles (or cosine similarity values) between the axis and each historical input vector assigned to the top-level bin of the axis. The number of sub-clusters is predefined (in the simplified example embodiment, 10 sub-clusters exist, with each sub-cluster including 10 historical input vectors). In this simplified example embodiment, the ten sub-clusters of the first dimension are delineated by the following range of angles: (i) sub-cluster 1 includes cosine similarity values from 0.950000 to 0.954999; (ii) sub-cluster 2 includes cosine similarity values from 0.955000 to 0.959999; (iii) sub-cluster 3 includes cosine similarity values from 0.960000 to 0.964999; (iv) sub-cluster 4 includes cosine similarity values from 0.965000 to 0.969999; (v) sub-cluster 5 includes cosine similarity values from 0.970000 to 0.974999; (vi) sub-cluster 6 includes cosine similarity values from 0.975000 to 0.979999; (vii) sub-cluster 7 includes cosine similarity values from 0.980000 to 0.984999; (viii) sub-cluster 8 includes cosine similarity values from 0.985000 to 0.989999; (ix) sub-cluster 9 includes cosine similarity values from 0.990000 to 0.994999; and (x) sub-cluster 10 includes cosine similarity values from 0.995000 to 1.0 With these ranges of cosine similarity values, each sub-cluster has 10 historical input vectors assigned to them, each having a different cosine similarity value that falls within the range for their assigned sub-cluster. In this simplified example embodiment, the new input vector, which had a cosine similarity measurement of 0.963333, is closest to the third sub-cluster.

Alternatively, the number of sub-clusters can be adjusted on the fly to accommodate a uniform quantity of vectors within each sub-cluster. Alternatively, the predetermined number of clusters can be different than the example of the simplified embodiment. As a further alternative, the number of sub-clusters can be based upon the number of top-level (for example, the number of sub-clusters is equal to a fraction or multiple of the number of top-level clusters). As yet a further alternative, the number of sub-clusters can be dynamically determined based on a predetermined limit value and the number of vectors within a given top-level cluster. For example, if the predetermined limit value of sub-clusters is 5, but there are only four vectors assigned to a given top-level cluster, then the sub-clusters may be collapsed into four or fewer sub-clusters, to reap efficiency benefits against checking against an empty sub-cluster.

Processing proceeds to operation S275, where vector-to-vector comparison mod 310 compares the generated vector to each vector within the determined sub-cluster until one or more matches within a threshold are identified. In this simplified embodiment, with 10 historical input vectors in each sub-cluster, and the third sub-cluster of the first top-level cluster having previously been determined as the closest sub-cluster of the new input vector, mod 310 compares the new input vector against each of the ten historical input vectors of the determined sub-cluster, until one or more matches are found within a predetermined threshold value. In this simplified embodiment, the threshold value is 0.000010. When referring to a threshold at this step, the threshold indicates a tolerance range between a cosine similarity of historical input vector with the axis of the top-level cluster and the cosine similarity of the new input vector with the axis of the top-level cluster. If the difference between the aforementioned cosine similarities is less than or equal to the threshold value, then the new input vector is considered a match for the historical input vector. Alternatively, a threshold value of 0 is used, indicating that only precisely equal vectors are considered matching. In this simplified embodiment, one of the ten historical input vectors of the determined sub-cluster has a cosine similarity measurement of 0.963330, which is different than the cosine similarity of the new input vector by a value of 0.000003 and is considered a match by mod 310. Comparisons against the cosine similarity measurements of the other nine historical input vectors yielded differences greater than 0.000010 and are not considered matches. In alternative embodiments, more than one historical input vector may match with the new input vector.

Figure 4:
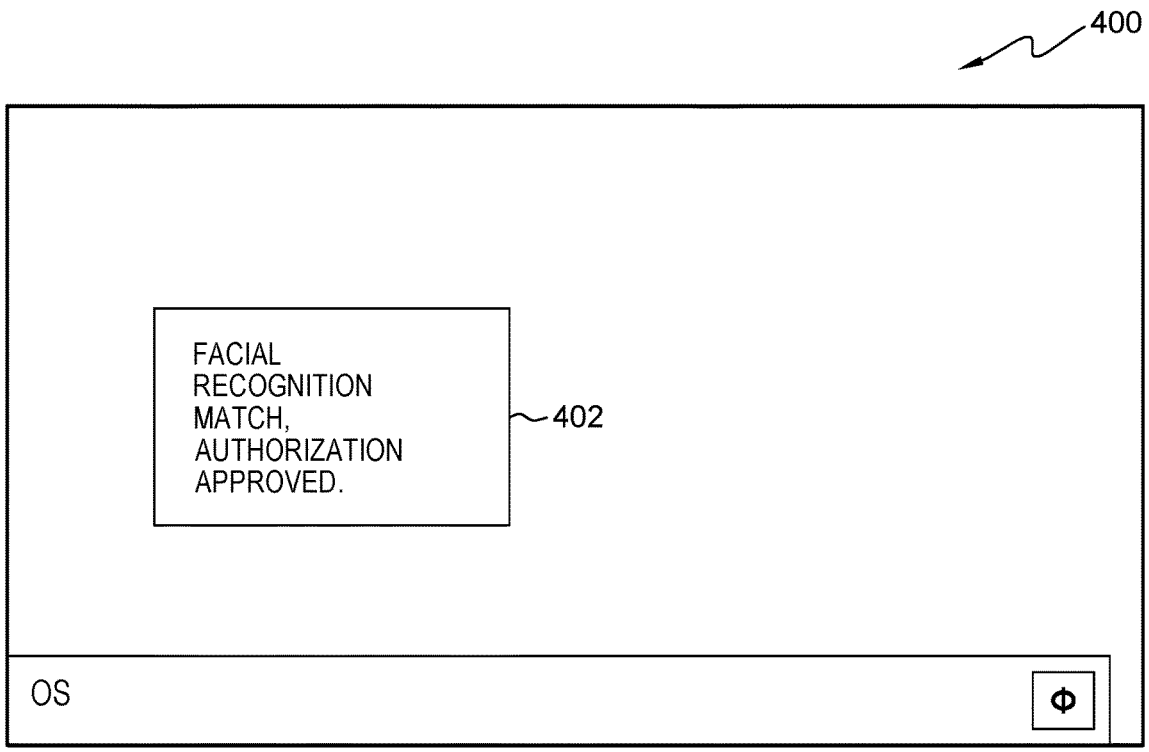
FIG. 4 is a screenshot view generated by the first embodiment system.

Processing proceeds to operation S280, where authorization mod 312 authorizes the requested access corresponding to the received input image. In this simplified embodiment, if a match with a historical input vector is found for the new input vector, which was generated from the received input image stored in mod 302, then authorization is provided to the accompanying request. As the new input vector matched with one of the historical input vectors, found through the novel clustering technique described above, authorization is provided. Alternative operations are possible, described below, using the novel clustering technique described in the present embodiments. In this simplified embodiment, authorization is reported to client 104 as displayed in message 402 of screenshot 400 of FIG. 4. In alternative embodiments, other types of notifications may be presented, as known in the art, or no notification beyond the provision of access requested by the authorization request may be provided.

III. Further Comments and/or Embodiments

Some embodiments of the present invention recognize the following facts, potential problems and/or potential areas for improvement with respect to the current state of the art: (i) typical enterprise level application or real-life applications deal with large amounts of data; (ii) applications dealing with biometric data matching bear no exception to this; (iii) in biometric data matching, large amounts of image data is typically required; (iv) since the biometric data is generally represented by high dimensional vectors/matrices, the problem is further magnified; (v) clustering or indexing of the data is frequently required to perform queries on the data or to perform some other computations on the data within usable time-frames; (vi) in the existing literature, there are some techniques available for clustering the data but each of them suffers either from instability or poor performance; (vii) there is a need for an effective clustering technique which can do the clustering of the data in such a manner that the fetched results of the queries should contain at least all the candidate results of the query and the time taken is in the order of "less than linear"; (viii) in the current disclosure, we solve these two major problems: (a) clustering high dimensional data with large number of identities effectively in a stable manner, and (b) fetching the queried data in a constant time, thereby improving the performance significantly; (ix) in any biometric matching system, we have a large amount of data which really consists of large number of individual identities; (x) as far as create, read, update and delete (CRUD) operations are concerned, one very important and much needed task is to cluster the data in such a manner that queries on the data are done in the best way i.e. in a least amount of time; (x) another important aspect is the accuracy of the queried results; (xi) the result set should contain at least all the suspected potential duplicates; and (xii) having large number of identities and high dimensional data, the existing clustering methods do not perform well; (xiii) further, they tend to be unstable which reduces the accuracy of the results; (xiv) most of the existing clustering techniques are unstable in nature because of the iterative process they follow to stabilize their clusters; (xv) query time in case of many existing clustering methods grows very rapidly as the data grows in size and it is somewhat proportional to that size; and (xvi) existing methods need to perform re-clustering once the data has grown by 40% or so in size.

Some embodiments of the present invention may include one, or more, of the following operations, features, characteristics and/or advantages: (i) one solution to the above recognized problems includes limiting the number of clusters to be created even after a large number of identities present using a binning approach, and retrieving the results in "less than linear time" while maintaining the accuracy of the result set; (ii) one of the many types of biometric data is facial image data; (iii) the context of facial image data will be used to discuss several embodiments; (iv) the techniques used herein can be extended to other kinds of biometric features as well with minor or no modifications; (v) raw facial image data is generally converted to multidimensional vectors in Euclidean space; (vi) every multidimensional vector is converted to a vector of length 1 such that the vectors are restricted to lie on the surface of a multidimensional hypersphere of radius 1; (vii) using some modules, we can convert a raw image data to a vector of 128 dimensions and, by dividing every component of the vector by its length, it can be reduced to a vector of length 1; (viii) therefore, one problem reduces to efficiently clustering the very large number of unit vectors of 128 dimension; (ix) if no clustering techniques are performed on the data, the naïve method (where the naïve method means the raw search, or checking for all the images one-by-one for the match) for searching the data will be linear in time which will become a severe problem while dealing with the large amount of data; (x) some proposed techniques in this disclosure work in constant time and therefore does not hamper the performance in the same ratio as the growth of the data; (xi) to solve the problem of large number of identities or clusters, this application proposes a methodology based on multilevel clustering; (xii) the approach used in this disclosure is a totally new and better performing approach to multi-level clustering of biometric data; and (xii) for the sake of explanation, two-level clustering is described in detail in the current disclosure.

Some embodiments of the present invention may include one, or more, of the following operations, features, characteristics and/or advantages: (i) in multilevel clustering, data is clustered at multiple levels based on some similarity measure used at each level; (ii) the similarity measure can be different at different levels based on the nature of the data; (iii) as per a first level of clustering, a subset of the entire data which is representative of the whole population is indexed/clustered and, in turn, each data point is assigned to one of the clusters; (iv) as per a second level of clustering, each data point inside a cluster is further indexed and thereby, every data point in that cluster gets associated to one of the sub-clusters of the cluster under consideration; (v) the process can be further continued to multiple levels of clustering as per present demands; (vi) all of the data points are vectors of length 1, and lie on the surface of a 128 dimensional hypersphere; and (vii) the similarity measure in Euclidean space is the distance between two vectors which can also be captured with the cosine similarity between the vectors which is calculated as EQ1, below.

$$\cos\emptyset = \frac{a \cdot b}{\|a\|\|b\|} \quad \text{EQ 1}$$

Some embodiments of the present invention may include one, or more, of the following operations, features, characteristics and/or advantages: (i) the proposed binning technique takes each axis as a bin; (ii) then separate the data points according to their closeness to the axis; (iii) consider each axis with their sign as a bin, so there will be 256 bins in a 128 dimensional space; (iv) for each given data point, it is possible to find which axis (or bin) is the closest by measuring the cosine similarity between the vector corresponding to the data point and all the axes; (v) then assign each data point to one of the bins based on the measure of closeness; (vi) by using this technique, the data points in one bin are the ones which are closer to each other in the space; (vii) with a fixed number of bins and that number of bins covers the space uniformly, this technique does not require creating more clusters or bins as the data increases in number; and (viii) since the number of bins/clusters are determined based on the dimension of the data (e.g. 128 in the present case), some of the described techniques can generally work for any dimensional of data by configuring the number of clusters accordingly.

Some embodiments of the present invention may include one, or more, of the following operations, features, characteristics and/or advantages: (i) once the data points are clustered in bins based on their closeness with the axes at the first level, the data points are clustered further within each bin in such a way that their retrieval becomes faster; (ii) for the second-level clustering, again use the information of cosine similarity of vectors with the axis or bin under which they are placed at the first level; (iii) inside of a bin, a fixed number of sub-bins are created based on the angles that data points make with respect to the axis to which they were assigned earlier at the first level (where the fixed number of sub-bins may be fixed by a user at design time based on the anticipated data size); (iv) a bin at this level is a range of angles of data points to the assigned axis of the bin; (v) any data which makes an angle with the assigned axis where the angle lies within the range of angles of that bin will be assigned to that bin at the second level; (vi) again, the data points which are very close to each other will fall into one bin; (vii) proceeding in the same way, cluster the data points in different bins on the basis of their cosine similarity measure and this process can be extended to multiple levels; and (viii) using the cosine similarity as the similarity measure ensures that similar data points are clubbed together in the bins at both levels.

Figure 5A:
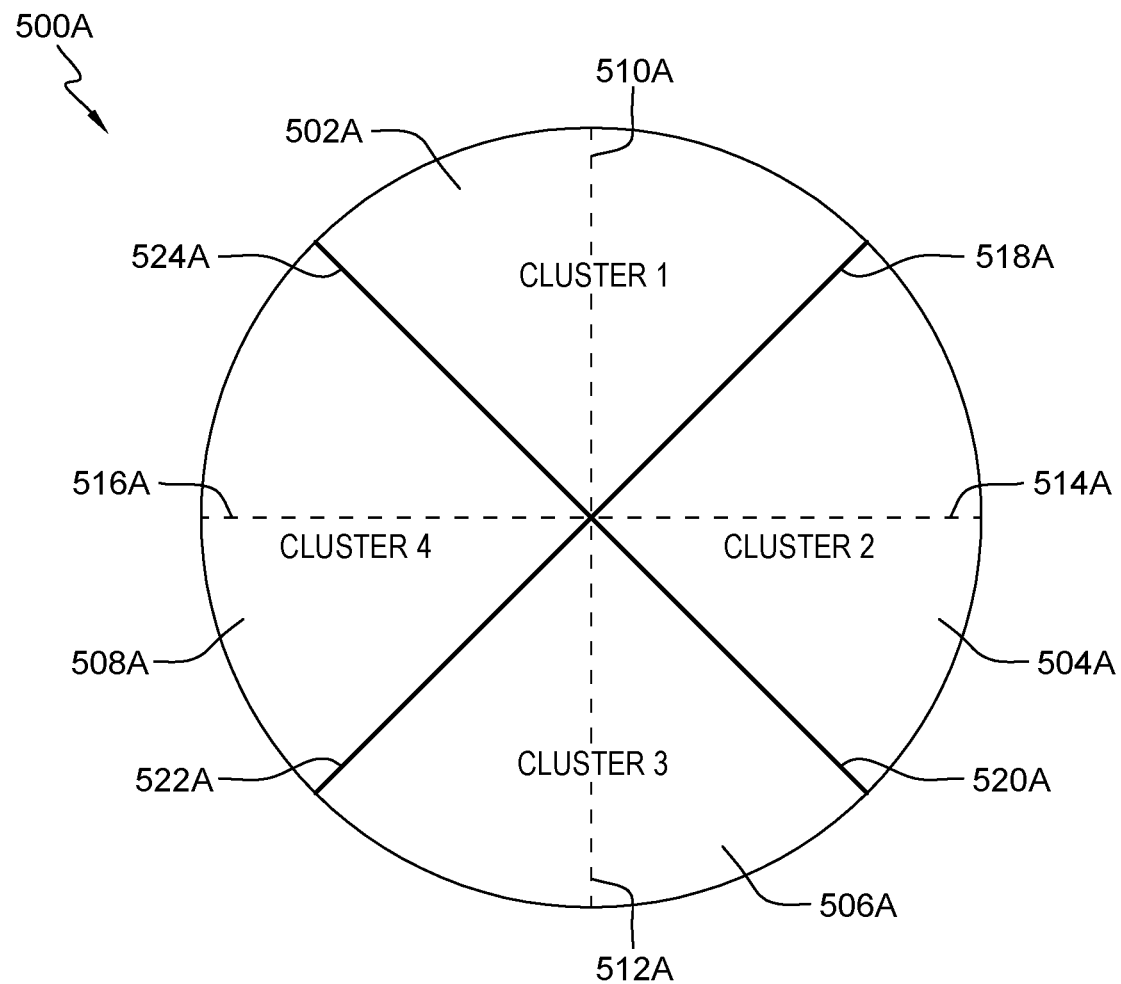
FIG. 5A is a diagram showing an example first-level clustering of two-dimensional vectors according to a second embodiment system.

Screenshot 500A of FIG. 5A shows a first level clustering according to a second embodiment of the present invention and includes: (i) cluster 1 502A; (ii) cluster 2 504A; (iii) cluster 3 506A; (iv) cluster 4 508A; (v) positive Y axis 510A; (vi) negative Y axis 512A; (vii) positive X axis 514A; (viii) negative X axis 516A; (ix) boundary 518A; (x) boundary 520A; (xi) boundary 522A; and (xii) boundary 524A. Cluster 1 502A includes all datapoints with vectors closest to axis 510A and is bounded by boundaries 524A and 518A. Cluster 2 504A includes all datapoints with vectors closest to axis 514A and is bounded by boundaries 518A and 520A. Cluster 3 506A includes all datapoints with vectors closest to axis 512A and is bounded 520A and 522A. Cluster 4 508A includes all datapoints with vectors closest to axis 516A and is bounded by boundaries 522A and 524A. A vector's closeness to an axis is determined by comparing cosine similarity between each axis and the vector. Four axes (two dimensions with two signs each) are presented for simplicity of explanation in a two-dimensional space such as a sheet of paper. Typical embodiments put into practice would employ many more axes, such as in the field of biometric facial data, where vectors typically have 128 dimensions, which would yield 256 axes (and therefore 256 bins) once positive and negative signs are accounted for.

Figure 5B:
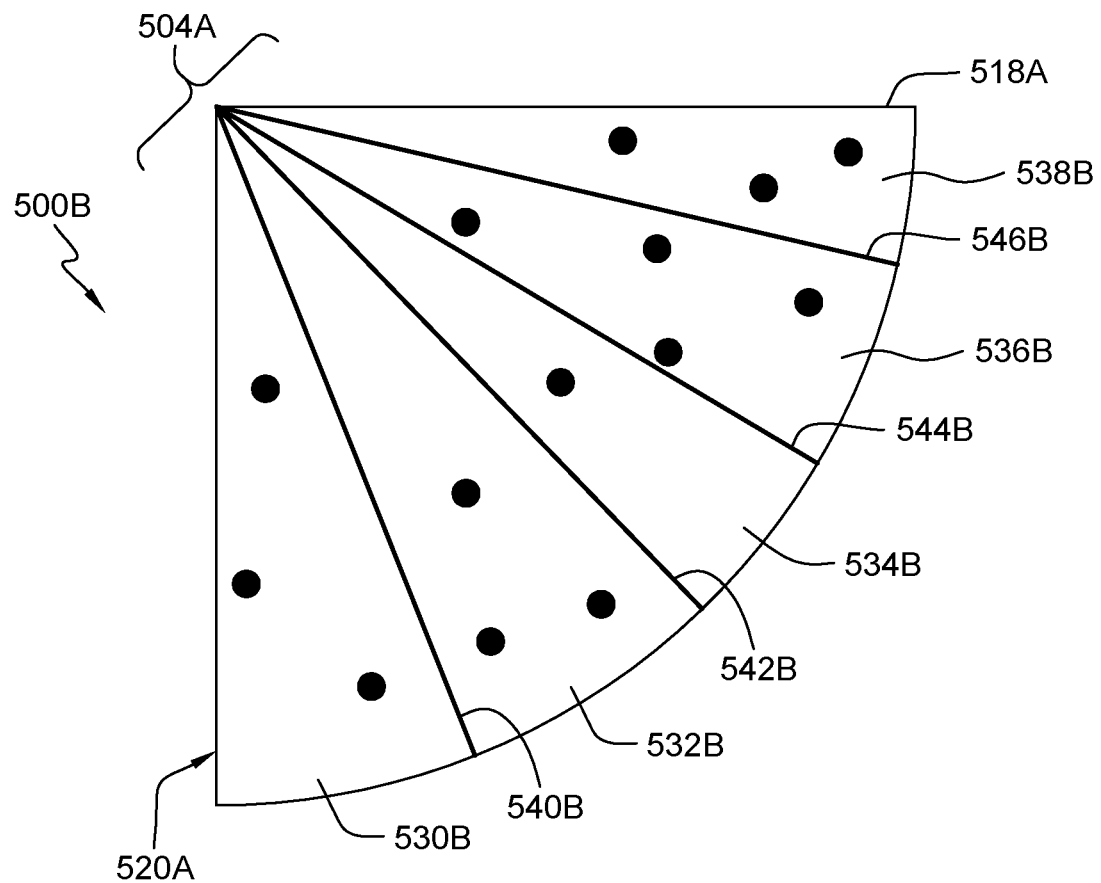
FIG. 5B is a diagram showing an example second-level clustering of two-dimensional vectors according to the second embodiment system.

Screenshot 500B of FIG. 5B shows a second level clustering of data points within cluster 2 504A of FIG. 5A according to the second embodiment of the present invention and includes: (i) cluster 2 504A; (ii) boundary 518A; (iii) boundary 520A; (iv) sub-bins 530B, 532B, 534B, 536B, and 538B; and (v) sub-bin boundaries 540B, 542B, 544B and 546B. In this second embodiment, each sub-bin represents a range of angles of cosine similarities between vectors of data points in cluster 2 504A and axis 514A, shown in FIG. 5A.

Some embodiments of the present invention may include one, or more, of the following operations, features, characteristics and/or advantages: (i) a facial biometric data image is represented as a vector of 128 dimensions; (ii) not all the elements of that vector are significant when it comes to comparison of two images/image vectors; (iii) the contribution of different elements of the vectors to an overall comparison score is not the same; (iv) check the variance of different elements over a sample of image vectors data; (v) elements with significantly less variance as compared to other elements are considered as insignificant; (vi) insignificant elements are removed from the image vectors, reducing the dimensions of the vectors and accelerating the comparison of two images/image vectors; (vii) some of the proposed clustering techniques exploit the vector similarity measure to find the relevant cluster and does not depend on any iterative process, enhancing stability over existing techniques; (viii) a fixed number of clusters using cosine similarity to detect the clusters results in a time complexity order of almost-constant; (ix) this approach does not require re-clustering because it is non-iterative in nature; (x) multilevel clustering of biometric data based on cosine similarity with the axes of hyperspace which is a non-iterative process and stable; (xi) the achieved complexity of search T(xn) is almost constant; (xii) a non-iterative, stable and faster multilevel clustering; (xiii) a multilevel clustering approach for biometric data based on cosine similarity measure which is non-iterative, stable and faster; and (xiv) a novel approach for multilevel clustering of biometric data using cosine similarity and other angle measures.

Some embodiments of the present invention may include one, or more, of the following operations, features, characteristics and/or advantages: (i) a bulk add operation, where a large number of image datapoints are processed and added to a database; (ii) process the image data in batches and generate their 128-dimensional embeddings; (iii) after embeddings are generated, select one embedding at a time, find the closest bin-center to assign selected embedding, and assign the selected embedding to that bin; (iv) for the second level, a sub-cluster inside this bin is found with the same closeness measure and the selected embedding is assigned to that sub-cluster; (v) in this way, all the images are processed in bulk; (vi) an add operation happens in a similar way as the bulk add but it is intended only for one image datapoint; (vii) first, generate the embedding from the incoming image datapoint; (viii) then, check with all the bin centers to find the closest one for this embedding; (ix) then, assign the embedding to the closest bin; (x) within the assigned bin, using the same similarity measure we assign the sub-cluster to this image; (xi) an update operation includes updating the image datapoint corresponding to an existing record in the system; (xii) the update process is similar to add in terms of finding clusters at multiple levels but there is a slight difference; (xiii) when updating, there are two possibilities: (a) after an update, the embedding based on the image does not fall in the same clusters/bins as before, or (a) the embedding falls in the same cluster as before; (xiv) in (a) case, updating the bin count is necessary as well as bin center information at various levels; (xv) in (b) case, only the center information is updated but not the count; (xvi) a search operation is for finding similar records for a given image datapoint input; (xvii) it starts with generating the embedding for the incoming image datapoint input; (xviii) then, finding the bin and the sub-cluster underneath at the lowest level that is closest to the generated embedding; (xix) then, every image embedding in that sub-cluster is compared against the input embedding and the ones having the comparison score beyond a system-defined threshold are returned in output as similar images to the input image datapoint.

Some embodiments of the present invention may include one, or more, of the following operations, features, characteristics and/or advantages: (i) a novel way of multilevel clustering the high dimensional data based on binning approach using cosine similarity; (ii) a clustering method which is stable because of being non-iterative in nature; (iii) a method having time-complexity of order almost-constant; (iv) a method which doesn't require re-clustering of the data even if the data keeps growing in number; (v) these methods combined result in an approach that yields 100 times better performance than the raw search on an example scale of 500,000 images; (vi) a reduction in the dimension of the vectors with the help of statistical analysis of different elements of the vectors.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

In an Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and application-specific integrated circuit (ASIC) based devices.

What is claimed is:

1. A computer-implemented method (CIM) comprising:
receiving a clustered images data set, with the clustered images data set including a plurality of top-level clusters, where a given top-level cluster is determined based on a signed axis and includes a plurality of sub-clusters, where a given sub-cluster is a range of values based, at least in part, on the signed axis of the given top-level cluster and includes one or more multidimensional vectors generated from historical images;
determining, from the plurality of top-level clusters, a subset of top-level clusters for removal based, at least in part, on relative similarity of the multidimensional vectors within the sub-clusters of the subset of top-level clusters compared to the multidimensional vectors within the sub-clusters of the other top-level clusters of the plurality of top-level clusters;
removing the subset of top-level clusters from the plurality of top-level clusters;
receiving an input image data set;
generating a multidimensional vector based on the input image data set;
determining a top-level cluster closest to the generated multidimensional vector based, at least in part, on the signed axes of the plurality of top-level clusters;
determining a sub-cluster of the determined top-level cluster closest to the generated multidimensional vector based, at least in part, on the signed axis of the determined top-level cluster and the generated multidimensional vector; and
determining a subset of one or more vectors of the determined sub-cluster as matches for the input image by comparing the generated multidimensional vector to one or more vectors of the determined sub-cluster.

2. The CIM of claim 1, wherein:
the vectors of the clustered images data set are based upon biometric facial image scans; and
the input image data set is a biometric facial image scan.

3. The CIM of claim 1, wherein:
the clustered images data set includes 256 top-level clusters based on vectors with 128 dimensions; and
each dimension includes a positive and negative sign.

4. The CIM of claim 1, wherein determining the top-level cluster closest to the generated multidimensional vector includes:
measuring a cosine similarity value between the signed axis of each top-level cluster and the generated multidimensional vector; and
selecting the top-level cluster with the measured cosine similarity value closest or equal to 1.

5. The CIM of claim 4, wherein the sub-clusters of a given top-level cluster of the clustered images data set are defined as ranges of cosine similarity values measured from the signed axis of the given top-level cluster and the one or more multidimensional vectors generated from historical images assigned to the top-level cluster.

6. The CIM of claim 5, wherein determining the sub-cluster of the determined top-level cluster closest to the generated multidimensional vector includes:
  determining which sub-cluster is defined by a range of values which includes the measured cosine similarity value between the signed axis of each top-level cluster and the generated multidimensional vector.

7. The CIM of claim 6, wherein the determining a subset of one or more vectors of the determined sub-cluster as matches for the input image by comparing the generated multidimensional vector to the plurality of vectors assigned to the determined sub-cluster includes:
  comparing the cosine similarity values of the generated multidimensional vector and the axis of the determined top-level cluster with the cosine similarity values of the axis of the determined top-level cluster and each vector in the determined sub-cluster; and
  determining a match for inclusion into the subset for each vector corresponding to a cosine similarity value within a predetermined threshold value of the cosine similarity value corresponding to the generated multidimensional vector.

8. A computer program product (CPP) comprising:
  a machine readable storage device; and
  computer code stored on the machine readable storage device, with the computer code including instructions for causing a processor(s) set to perform operations including the following:
    receiving a clustered images data set, with the clustered images data set including a plurality of top-level clusters, where a given top-level cluster is determined based on a signed axis and includes a plurality of sub-clusters, where a given sub-cluster is a range of values based, at least in part, on the signed axis of the given top-level cluster and includes one or more multidimensional vectors generated from historical images,
    determining, from the plurality of top-level clusters, a subset of top-level clusters for removal based, at least in part, on relative similarity of the multidimensional vectors within the sub-clusters of the subset of top-level clusters compared to the multidimensional vectors within the sub-clusters of the other top-level clusters of the plurality of top-level clusters,
    removing the subset of top-level clusters from the plurality of top-level clusters,
    receiving an input image data set,
    generating a multidimensional vector based on the input image data set,
    determining a top-level cluster closest to the generated multidimensional vector based, at least in part, on the signed axes of the plurality of top-level clusters,
    determining a sub-cluster of the determined top-level cluster closest to the generated multidimensional vector based, at least in part, on the signed axis of the determined top-level cluster and the generated multidimensional vector, and
    determining a subset of one or more vectors of the determined sub-cluster as matches for the input image by comparing the generated multidimensional vector to one or more vectors of the determined sub-cluster.

9. The CPP of claim 8, wherein:
  the vectors of the clustered images data set are based upon biometric facial image scans; and
  the input image data set is a biometric facial image scan.

10. The CPP of claim 8, wherein:
  the clustered images data set includes 256 top-level clusters based on vectors with 128 dimensions; and
  each dimension includes a positive and negative sign.

11. The CPP of claim 8, wherein determining the top-level cluster closest to the generated multidimensional vector includes:
  measuring a cosine similarity value between the signed axis of each top-level cluster and the generated multidimensional vector; and
  selecting the top-level cluster with the measured cosine similarity value closest or equal to 1.

12. The CPP of claim 11, wherein the sub-clusters of a given top-level cluster of the clustered images data set are defined as ranges of cosine similarity values measured from the signed axis of the given top-level cluster and the one or more multidimensional vectors generated from historical images assigned to the top-level cluster.

13. The CPP of claim 12, wherein determining the sub-cluster of the determined top-level cluster closest to the generated multidimensional vector includes:
  determining which sub-cluster is defined by a range of values which includes the measured cosine similarity value between the signed axis of each top-level cluster and the generated multidimensional vector.

14. The CPP of claim 13, wherein the determining a subset of one or more vectors of the determined sub-cluster as matches for the input image by comparing the generated multidimensional vector to the plurality of vectors assigned to the determined sub-cluster includes:
  comparing the cosine similarity values of the generated multidimensional vector and the axis of the determined top-level cluster with the cosine similarity values of the axis of the determined top-level cluster and each vector in the determined sub-cluster; and
  determining a match for inclusion into the subset for each vector corresponding to a cosine similarity value within a predetermined threshold value of the cosine similarity value corresponding to the generated multidimensional vector.

15. A computer system (CS) comprising:
  a processor(s) set;
  a machine readable storage device; and
  computer code stored on the machine readable storage device, with the computer code including instructions for causing the processor(s) set to perform operations including the following:
    receiving a clustered images data set, with the clustered images data set including a plurality of top-level clusters, where a given top-level cluster is determined based on a signed axis and includes a plurality of sub-clusters, where a given sub-cluster is a range of values based, at least in part, on the signed axis of the given top-level cluster and includes one or more multidimensional vectors generated from historical images,
    determining, from the plurality of top-level clusters, a subset of top-level clusters for removal based, at least in part, on relative similarity of the multidimensional vectors within the sub-clusters of the subset of top-level clusters compared to the multidimensional vectors within the sub-clusters of the other top-level clusters of the plurality of top-level clusters,
    removing the subset of top-level clusters from the plurality of top-level clusters,
    receiving an input image data set, generating a multidimensional vector based on the input image data set, determining a top-level cluster closest to the generated multidimensional vector based, at least in part, on the signed axes of the plurality of top-level clusters, determining a sub-cluster of the determined top-level cluster closest to the generated multidimensional vector based, at least in part, on the signed axis of the determined top-level cluster and the generated multidimensional vector, and determining a subset of one or more vectors of the determined sub-cluster as matches for the input image by comparing the generated multidimensional vector to one or more vectors of the determined sub-cluster.

16. The CS of claim 15, wherein:
the vectors of the clustered images data set are based upon biometric facial image scans; and
the input image data set is a biometric facial image scan.

17. The CS of claim 15, wherein:
the clustered images data set includes 256 top-level clusters based on vectors with 128 dimensions; and
each dimension includes a positive and negative sign.

18. The CS of claim 15, wherein determining the top-level cluster closest to the generated multidimensional vector includes:
measuring a cosine similarity value between the signed axis of each top-level cluster and the generated multidimensional vector; and
selecting the top-level cluster with the measured cosine similarity value closest or equal to 1.

19. The CS of claim 18, wherein:
the sub-clusters of a given top-level cluster of the clustered images data set are defined as ranges of cosine similarity values measured from the signed axis of the given top-level cluster and the one or more multidimensional vectors generated from historical images assigned to the top-level cluster; and determining the sub-cluster of the determined top-level cluster closest to the generated multidimensional vector includes determining which sub-cluster is defined by a range of values which includes the measured cosine similarity value between the signed axis of each top-level cluster and the generated multidimensional vector.

20. The CS of claim 19, wherein the determining a subset of one or more vectors of the determined sub-cluster as matches for the input image by comparing the generated multidimensional vector to the plurality of vectors assigned to the determined sub-cluster includes:

comparing the cosine similarity values of the generated multidimensional vector and the axis of the determined top-level cluster with the cosine similarity values of the axis of the determined top-level cluster and each vector in the determined sub-cluster; and determining a match for inclusion into the subset for each vector corresponding to a cosine similarity value within a predetermined threshold value of the cosine similarity value corresponding to the generated multidimensional vector.

* * * * *